Nov. 24, 1936.  K. RÄNTSCH  2,062,146
OPTICAL LENS SYSTEM FOR LENTICULAR FILMS
Filed Aug. 17, 1933
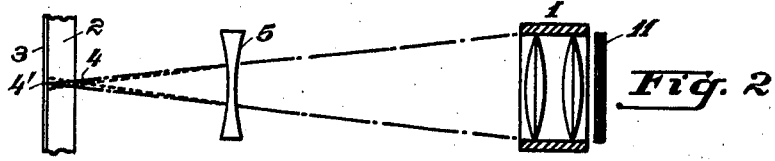
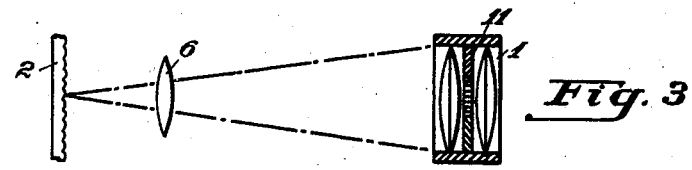
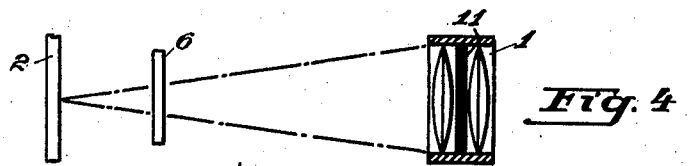
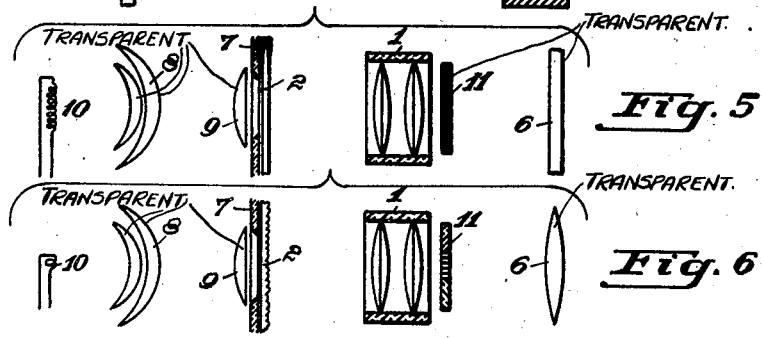
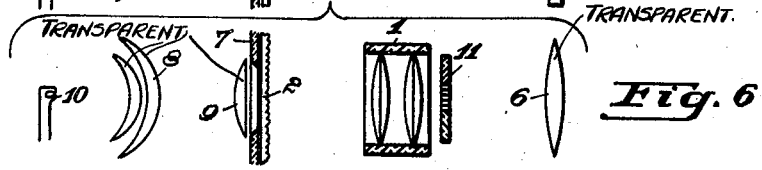
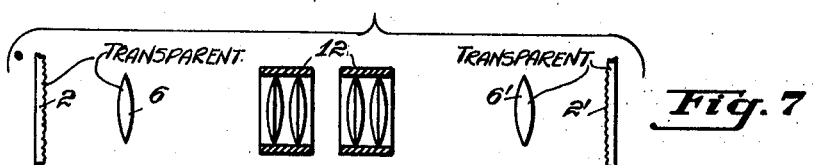
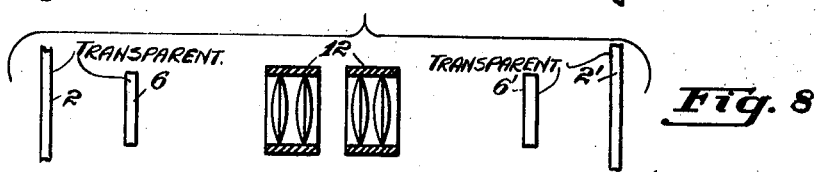
INVENTOR
Kurt Räntsch
By: Gifford, Scull & Burgess
ATTORNEYS.

Patented Nov. 24, 1936

2,062,146

UNITED STATES PATENT OFFICE 2,062,146

OPTICAL LENS SYSTEM FOR LENTICULAR FILMS

Kurt Räntsch, Berlin-Teltow (Seehof), Germany, assignor to Opticolor Aktiengesellschaft, Glarus, Switzerland, a corporation of Switzerland Application August 17, 1933, Serial No. 685,505
In Germany August 27, 1932

3 Claims. (Cl. 88—16.4)

This invention relates to an improved optical lens system for lenticulated films. It is applicable for taking, projecting and printing purposes. The advantage of the new optical system is that it allows to obtain sharper images.

The principle of this invention may be seen by the following reflection which concerns the taking of images for color cinematography on lenticulated films, though it may easily be seen that the same principle is valid when films are printed or projected or when the films serve for stereoscopic purposes.

Generally the lenticulation is formed by many cylindrically shaped lenses parallel to each other. These lenses have a considerable influence on the path of light rays when a section normal to the direction of the lenses is regarded, while their influence in a section parallel to the lenses is only that of a plane surface. If now a multicolor screen is placed near or between the camera lenses and a view is taken, the lenses are generally focussed as to give a sharp image in the front plane of the film. Thereby it is not necessary to take account of the lenticulation when focussing, as e. g. the height of the lenses on a film of the normal thickness of about 0.13 mm. is only 0.004 mm. From this follows that a sharp image is formed in the front surface of the film not only when a section normal, but also when a section parallel to the lenses is drawn. In the parallel section the rays converge also at a point of the front surface and give a small unsharp spot on the photographic layer, the diameter of this spot being about equal to the breadth of the lenticular elements.

This fault would not be essential when only views would be taken. But as there is the same diffusion when the films are printed and projected, all these faults are added to each other so that the diameter or height of the diffusion spot is about three or four times the breadth of a lenticular element, both dimensions measured on the projection screen.

If on the other hand the camera lenses as well as the printing and projection lenses would be focussed as to give sharp images in a section parallel to the lenses, the images of all objects would have colored shades or fringes, which too would become more disturbing by printing and projecting.

All these faults are avoided by the employment of the new lens systems, which are so constructed that the distances between the rear lens surface and the rear focal points are different from each other, according as a section perpendicular or in parallel to the lenses is drawn. The distance is smaller in the section perpendicular to the lenses by the optical thickness of the film, which is equal to its real thickness divided by the refraction index of the celluloid. The optical thickness is about 0.1 mm.

Some examples of the new lens systems are represented in the figures which show views of four different devices, each in two sections, perpendicular and parallel to the lenticulations.

Figs. 1 and 2 are diagrammatic sections taken through a lens system at right angles to each other and showing one form which the invention may take when used with a camera;

Figs. 3 and 4 are views corresponding respectively to Figs. 1 and 2, but showing another form which the invention may take, likewise when used with a camera;

Figs. 5 and 6 are views likewise corresponding to Figs. 1 and 2, but showing the invention as embodied in a projecting device;

Figs. 7 and 8 are views corresponding to Figs. 5 and 6, but showing the invention as used with a printing device.

The systems in Fig. 1 through 4 may serve for taking or projecting purposes.

The systems drawn in Figs. 5 and 6 are projecting devices. The systems drawn in Figs. 7 and 8 are printing devices.

Referring first to Figs. 1 and 2, part of the lens system is designated by 1. This part may be a normal camera lens. The lenticulated surface of the film 2 faces this system. The emulsion layer 3 is on the rear surface of the film. The polychromatic screen 11 may be placed in front of the lens 1. Fig. 1 is a section normal and Fig. 2 parallel to the lenticular elements. The distance between the film 2 and the lens system 1 is such that the rays emerging from one point of the taken objects converge at point 4. Correspondingly all rays passing through point 4 converge at one well defined point of the screen when the film is projected.

It is sufficient to consider the taking process. Then the images of the objects are divided into many strips parallel to the lenticular elements. Each strip is as wide as an element and is formed by it. Details of the objects whose images are smaller than the breadth of a strip can not be photographed. This results from the fact that a lenticular element averages all rays of the light-beam, the breadth of which is given by the arrow drawn near point 4. The lenticulation serves only for separating the rays according to their directions, i. e. their colors. If, as is the case with all optical systems employed till now, the lens system 1 is only composed by lenses with spherical surfaces, the rays emerging from one point of the object are converging at the point 4 in both sections, so that there is formed on the emulsion layer a rectangular spot, the dimensions of which are functions of the angular opening of the system 1 and of the thickness of the film. In order to compensate for this, a cylindrical lens 5 is placed between the lens system 1 and the film 2. This cylindrical lens is a negative lens and is arranged so that the axes of their cylindrical surfaces are running perpendicular to the lenticular elements. Thus, in the section of Fig. 2, it augments the distance between the rear focal plane and the lens system by the reduced thickness of the film, if its curvature is correctly chosen. The consequence is that in this section all rays emerging from one point of the object are exactly converging at the point 4' lying in the photographic layer.

Sometimes account must be taken of the fact that, in the section of Fig. 1, the cylindrical lens 5 has the effect of a plate with plane and parallel surfaces so that a small deflection of the image occurs.

When the new lens system is employed, the number of separate and independent elements forming the image (like mosaic work) is no longer very limited by the fact that the lenticulation is distant from the photographic layer, but is—at least in the section parallel to the lenticular elements—only limited by the fineness of the emulsion and its faculty of separating near points.

A cylindrical lens may be employed for taking, printing and projecting. It is preferably arranged near the film, as, in this case, it does not alter the focal distance of the system 1 in any appreciable manner. It must have at least one cylindrical surface. As is represented in Figs. 3 and 4 a positive lens 6 with its axes running in parallel to the lenticular elements may be employed instead of the negative lens 5. This lens too is placed between the film 2 and the system 1 formed by lenses with only spherical surfaces. The filter 11 may be arranged between the lenses of the system 1.

In Fig. 5 is drawn a section parallel and in Fig. 6 vertical to the lenticulations of a film 2. The film runs through the gate 7 and is lighted by the source 10, the condenser 8 and the collimating lens 9. The lens system 1 with the color filter 11 is arranged in front of the gate. In order to get, in the two sections, optical paths of different distances between the film and the objective, a positive cylindrical lens 6 is placed in front of the lens system 1, e. g. in its front focal plane. Its axes are running in parallel to the lenticular elements.

At last the device represented by Figs. 7 and 8 serves for printing by projection. The lens system 12, which is preferably symmetrical, images the lenticular film 2 upon the lenticular film 2'. Near film 2 and near film 2' are arranged the cylindrical lenses 6 and 6' respectively, which may be positive lenses. Instead of two lenses 6 and 6', it is also possible to employ only one lens near one of the films and of about double the refractive power. It is sometimes preferable to arrange this lens in one of the focal planes, as then the local lengths in both sections are nearly the same ones.

What I claim is:

1. In an optical system, a film comprising a base having on one side thereof a multiplicity of parallel cylindrical lenticulations and having an emulsion on the other side thereof, a spherical lens cooperating with a lenticulation to form an image in said emulsion back of said lenticulation, and an auxiliary cylindrical lens spaced from said film and disposed between the film and said spherical lens and cooperating with said lenticulation to cause all light passing therethrough to focus substantially on one plane, thereby forming an image in the emulsion of equal sharpness when considered in a direction parallel to a lenticulation and in a direction at right angles thereto.

2. In an optical system, a film comprising a base having on one side thereof a multiplicity of parallel cylindrical lenticulations and having an emulsion on the other side thereof, a spherical lens cooperating with a lenticulation to form an image in said emulsion back of said lenticulation, and an auxiliary negative cylindrical lens spaced from said film and disposed between the film and said spherical lens, the axis of said cylindrical lens extending substantially normal to the axis of a lenticulation, and said cylindrical lens cooperating with said lenticulation to cause all light passing therethrough to focus substantially on one plane, thereby forming an image in the emulsion of equal sharpness when considered in a direction parallel to a lenticulation and in a direction at right angles thereto.

3. In an optical system, a film comprising a base having on one side thereof a multiplicity of parallel cylindrical lenticulations and having an emulsion on the other side thereof, a spherical lens cooperating with a lenticulation to form an image in said emulsion back of said lenticulation, an auxiliary positive cylindrical lens spaced from said film and disposed between the film and said spherical lens, the axis of said cylindrical lens being disposed substantially parallel to the axis of a lenticulation and cooperating with said lenticulation to cause all light passing therethrough to focus substantially on one plane, thereby forming an image in the emulsion of equal sharpness when considered in a direction parallel to a lenticulation and in a direction at right angles thereto.

KURT RÄNTSCH.